(12) United States Patent
Ura et al.

(10) Patent No.: US 7,196,795 B2
(45) Date of Patent: Mar. 27, 2007

(54) LASER MEASUREMENT APPARATUS

(75) Inventors: Haruo Ura, Takamatsh (JP); Makoto Ono, Takamatsu (JP); Yasuomi Ohno, Takamatsu (JP)

(73) Assignee: Soatec Inc., Takamatsu (JP)

( * ) Notice: Subject to any disclaimer, the term of this patent is extended or adjusted under 35 U.S.C. 154(b) by 437 days.

(21) Appl. No.: 10/823,166

(22) Filed: Apr. 13, 2004

(65) Prior Publication Data

US 2004/0233460 A1 Nov. 25, 2004

(30) Foreign Application Priority Data

May 19, 2003 (JP) .............................. 2003-140253

(51) Int. Cl.
*G01N 21/00* (2006.01)

(52) U.S. Cl. ..................................... 356/437
(58) Field of Classification Search ................ 356/437, 356/445–448
See application file for complete search history.

(56) References Cited

U.S. PATENT DOCUMENTS

| 4,386,848 A | 6/1983 | Clendenin et al. | |
|---|---|---|---|
| 6,822,742 B1 * | 11/2004 | Kalayeh et al. | 356/437 |
| 7,006,203 B1 * | 2/2006 | Book et al. | 356/5.01 |

FOREIGN PATENT DOCUMENTS

| JP | 62 165113 A | 7/1987 |
|---|---|---|
| JP | 06 307858 A | 11/1994 |
| JP | 07 012934 A | 1/1995 |
| JP | 2002-082045 | 3/2002 |
| JP | 2002-181533 | 6/2002 |

OTHER PUBLICATIONS

European Search Report for corresponding Application No. 04009983.0 dated May 3, 2005.

* cited by examiner

*Primary Examiner*—Gregory J. Toatley, Jr.
*Assistant Examiner*—Isiaka O. Akanbi
(74) *Attorney, Agent, or Firm*—Renner, Otto, Boisselle & Sklar, LLP (57) ABSTRACT

A laser measurement apparatus for carrying out measurement using a laser beam that is capable of performing various types of measurement with a simple structure is provided. Optical signal processing units 103, 104, 105 output laser beams $\lambda 1, \lambda 2, \lambda 3$ having different wavelengths via a common optical path A toward an object to be measured, and detect the laser beams being reflected by a corner cube 100 attached to the object to be measured. A control unit 102 controls motors 110, 111 so that the laser beams return to a predetermined position of a optical position sensing device 117 of an optical signal processing unit 103, according to which the direction of a reflecting mirror 112 is controlled so that the laser beams follow the object. The control unit 102 computes the distance to the object, or the shape, position, speed etc. of the object based on signals detected at the optical signal processing units 104, 105.

13 Claims, 4 Drawing Sheets

LASER MEASUREMENT APPARATUS

The present application claims priority from Japanese patent application No. 2003-140253 filed on May 19, 2003, the contents of which is hereby incorporated by reference into this application.

FIELD OF THE INVENTION

The present invention relates to a laser measurement apparatus that performs measurement using laser beams.

DESCRIPTION OF THE RELATED ART

Heretofore, laser measurement apparatuses have been developed that use laser beams to perform various types of measurements, such as the measurement of a shape of an object, the measurement of a speed of a moving object or the measurement of a distance between plural points (refer to Patent document 1 and Patent document 2).

For example, in a laser measurement apparatus comprising two movable reflecting mirrors and two servomotors for controlling the direction of each of the reflecting mirrors (a two-servomotor and two-mirror type laser measurement apparatus), the directions of the two reflecting mirrors are changed by controlling the rotational positions of the two servomotors. Thus, by appropriately combining the directions of the reflecting mirrors, the apparatus is capable of changing the direction of the laser beam being reflected on the reflecting mirrors and outputting the laser beam to a desired direction such as toward an object, and the apparatus can thereby carry out various types of measurements such as the measurement of a shape of the object or the distance thereto.

Moreover, according to a laser measurement apparatus utilizing two servomotors, a single reflecting mirror and a gimbal mechanism (a gimbal-type laser measurement apparatus), the two servomotors control the rotation of the gimbal mechanism, and the gimbal mechanism controls the reflecting mirror to face a desired direction. Thereby, the apparatus reflects the laser beam on the reflecting mirror toward the object or the like, and carries out various types of measurements such as the measurement of a shape of the object or the distance thereof.

Patent Document 1

Japanese Patent Application Laid-Open No. 2002-82045

Patent Document 2

Japanese Patent Application Laid-Open No. 2002-181533

However, the two-servomotor and two-mirror type laser measurement apparatus mentioned above requires two movable reflecting mirrors, and therefore, the structure of the apparatus is complex.

Moreover, according to the conventional gimbal-type laser measurement apparatus, the separation of the P waves (longitudinal waves) and S waves (transverse waves) in the laser beam is troublesome, and the down sizing of the apparatus is difficult.

Even further, when the above-mentioned prior art laser measurement apparatuses were applied as outdoor apparatuses for measuring distance, the apparatuses were capable of measuring a distance to an object that is in a static state, but were not capable of measuring the distance to a moving object. Therefore, the prior art apparatuses could not measure the speed or the like of moving objects.

SUMMARY OF THE INVENTION

The object of the present invention is to provide a laser measurement apparatus that uses laser beams to perform measurement, which is capable of performing various types of measurement by a simple structure.

Further, the object of the present invention is to provide a laser measurement apparatus that uses laser beams to perform measurement, which is capable of performing various types of measurement by a simple structure, and which can be downsized.

The present invention provides a laser measurement apparatus comprising: a plurality of laser beam generating means for outputting laser beams having different characteristics; a plurality of optical signal processing means disposed so as to correspond to each of the laser beams for detecting the corresponding laser beam and carrying out a predetermined process; and an optical path means for guiding the laser beams output from the plurality of laser beam generating means via a common optical path to an object and for guiding the laser beams returning from the object via the common optical path to the optical signal processing means.

The plurality of laser beam generating means output laser beams having different characteristics, respectively. The plurality of optical signal processing means are designed to correspond to each of the laser beams, respectively, to detect the corresponding laser beam and to perform a predetermined process. The optical path means guides the laser beams output from the plurality of laser beam generating means via a common optical path to the object and guides the laser beams returning from the object via the common optical path to the optical signal processing means.

According to one aspect of the invention, the optical path means includes an optical guiding means, and the laser measurement apparatus can further comprise a control means for controlling the optical guiding means so as to guide the laser beams output from the plurality of laser beam generating means toward the object and to guide the laser beams returning from the object toward the plurality of optical signal processing means.

According to another aspect of the invention, the optical guiding means is a reflecting mirror, and the control means can control the reflecting mirror to reflect the laser beams output from the plurality of laser beam generating means toward the object and to reflect the laser beams returning from the object back toward the plurality of optical signal processing means.

According to another aspect of the invention, one of the plurality of laser beams having different characteristics is a laser beam used for tracking, and the optical signal processing means corresponding to this laser beam comprises an optical position sensing device; and the control means can control the direction of the reflecting mirror so that the laser beams output from the plurality of laser beam generating means are reflected toward the object based on signals output from the optical position sensing device.

According to yet another aspect of the invention, the plurality of laser beams having different characteristics include plural laser beams for measuring distances according to different measurement scales, and the optical signal processing means corresponding to each of the laser beams have photodetectors that detect the presence or absence of a beam that is of a predetermined level and above, and outputs a signal corresponding to the presence or absence of such beam; and the control means computes a distance between the object and a reference position based on the output signals from each of the photodetectors.

Furthermore, the optical path means can be formed to include an optical fiber cable.

DETAILED DESCRIPTION OF THE PREFERRED EMBODIMENT

Now, a laser measurement apparatus according to a preferred embodiment of the present invention will be described with reference to the accompanied drawings. In the drawings, the same components are denoted by the same reference numbers.

Figure 1:
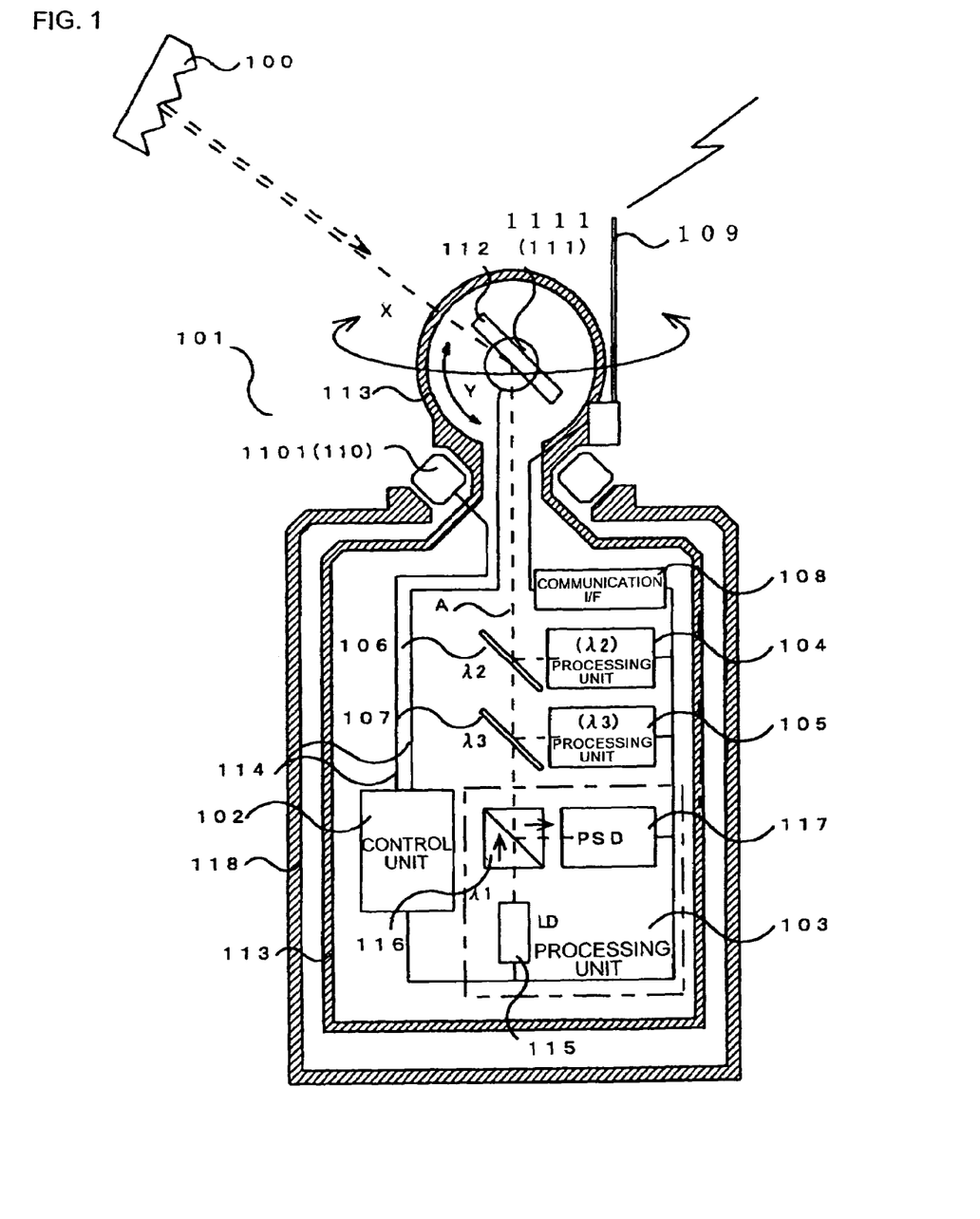
FIG. 1 is a schematic view of a laser measurement apparatus according to a first embodiment of the present invention.
Figure 2:
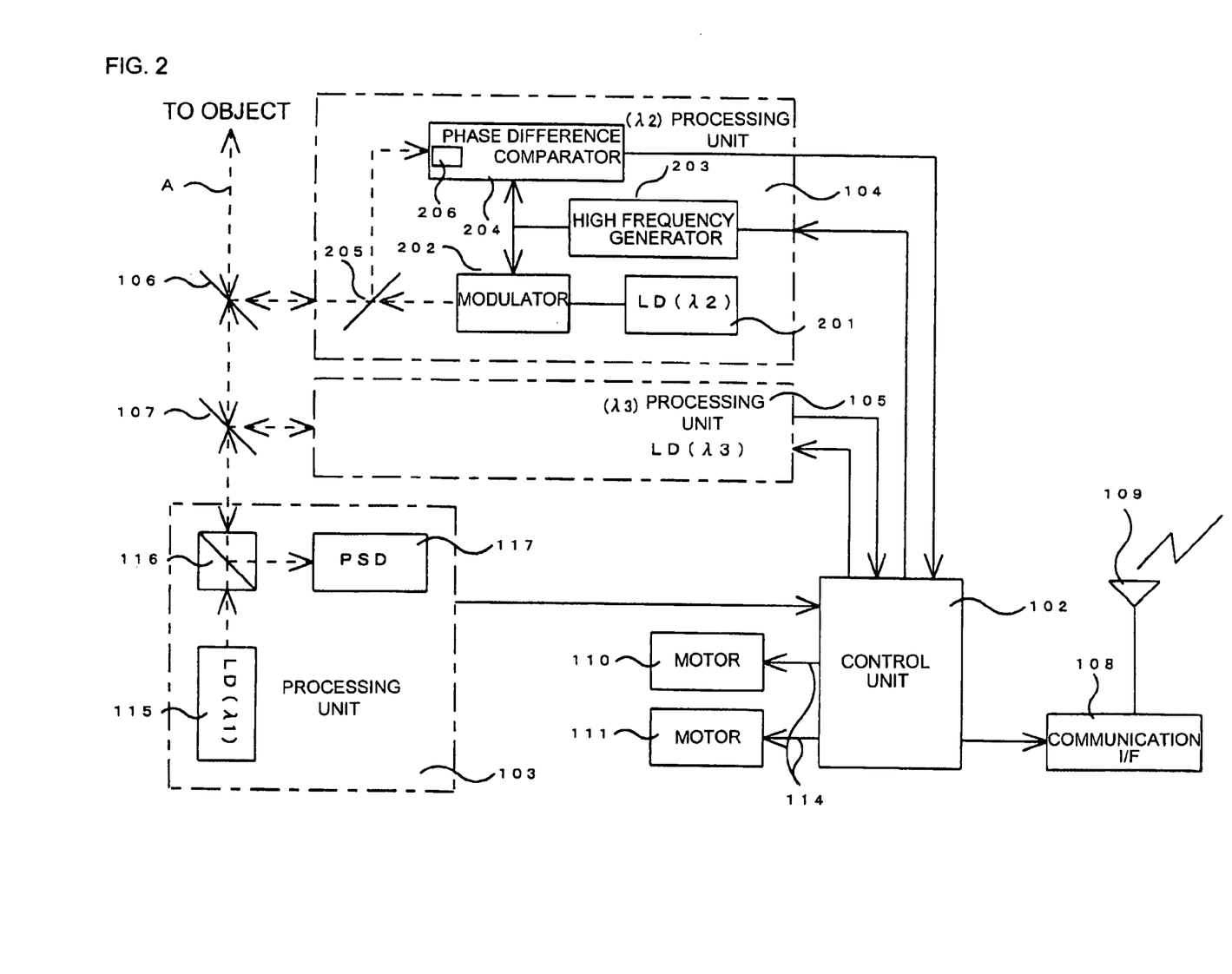
FIG. 2 is a block diagram showing a circuit and an optical system of the laser measurement apparatus according to the first embodiment of the present invention.

FIG. 1 is a schematic view of a laser measurement apparatus according to a first embodiment of the present invention, and FIG. 2 is a block diagram showing a circuit and an optical system according to the first embodiment of the present invention.

According to FIGS. 1 and 2, a laser measurement apparatus 101 comprises a plurality of optical signal processing units 103, 104, 105, a plurality of optical filters 106, 107, a communication interface (I/F) 108 for data communication, an antenna 109, a plurality of motors 110, 111, a reflecting mirror 112 (wherein the motor 111 and the reflecting mirror 112 constitute a galvanometer mirror) and a control unit 102.

A main case 118 fixed to a determined position during use houses therein a minor case (hereinafter also referred to as a movable case) 113 that is capable of rotating in direction X (that is, within a plane orthogonal to the face of the sheet). Between the main case 118 and the minor case 113 is disposed a rotary drive unit (rotary drive mechanism) 1101 with an encoder function and including the motor 110, and the minor case 113 is driven by the rotary drive unit 1101 to rotate in direction X.

The minor case 113 houses the control unit 102, the plurality of optical signal processing units 103 through 105, the optical filters 106, 107, the communication I/F 108, a rotary drive unit (rotary drive mechanism) 1111 with an encoder function and including the motor 111, and the reflecting mirror 112.

The reflecting mirror 112 is supported so as to be able to rotate in direction Y (that is, within a plane parallel to the face of the sheet) by the rotary drive unit 1111 including the motor 111. The center of rotation of the reflecting mirror 112 being rotated in direction Y by the motor 111 exists on an optical path A, and the axis of rotation of the reflecting mirror 112 being rotated in direction Y by the motor 111 is formed to be orthogonal to the optical path A.

A laser beam traveling through the optical path A and reflected on the reflecting mirror 112 is output toward the direction of an object to be tracked (object to be measured) A reflecting member (such as a corner cube 100) is attached to a surface of the object to be measured, and the laser beam being reflected on the object (actually, the corner cube 100) is returned toward the laser measurement apparatus 101.

The axis of rotation of the movable case 113 is formed to be parallel to the optical path A. In other words, the axis of rotation of the movable case 113 is formed to be orthogonal to the axis of rotation of the reflecting mirror 112 rotated by the motor 111. The rotary drive mechanism has a rotary drive function and an encoder function to detect the amount of rotation of the movable case 113, and is capable of driving the movable case 113 to rotate continuously.

The control unit 102 performs control of the overall laser measurement apparatus 101, and also performs control of the components of the laser measurement apparatus 101, such as the motors 110 and 111. Moreover, the control unit 102 performs such processes as the tracking control of the object based on optical signals detected by the optical signal processing units 103 through 105, computation processes for computing the distance from a certain point to the object, the shape of the object, the position thereof, the traveling speed, the traveling direction, the distance to the object from a given point, and so on.

The optical signal processing unit 103 comprises a laser beam generating unit (for example, a laser diode LD) 115 for outputting a laser beam having a first wavelength λ1 (for example, 630 nm) to the optical path A, a polarized beam splitter 116 for transmitting a longitudinal wave (P wave) component of the laser beam being incident on the splitter from the laser beam generating unit 115 to the optical path A and reflecting a transverse wave (S wave) component of the laser beam being incident on the splitter from the outside via the optical path A toward an optical position sensing device (PSD) 117, and a PSD 117 for detecting the position of the laser beam comprising the transverse wave component output via the polarized beam splitter 116. The polarized beam splitter 116 is located so as to correspond to the optical path A. The PSD 117 is equipped with a function to detect the position of the received laser beam, and outputs the positional information of the received laser beam as an output signal to the control unit 102. The laser beam output from the laser beam generating unit 115 is used as a tracking laser beam for tracking the object to be measured.

The optical signal processing unit 104 comprises a laser beam generating unit (for example, a laser diode LD) 201 for outputting a laser beam having a second wavelength λ2 (for example, 670 nm) that differs from the wavelength λ1 of the laser beam utilized by the optical signal processing unit 103, a high frequency generator 203, a modulator 202 for modulating the laser beam out put from the laser beam generating unit (LD) 201 according to the signal output from the high frequency generator 203 and outputting the same, a polarized beam splitter 205 for transmitting a longitudinal wave (P wave) component of the laser beam output from the modulator 202 to the optical path A and reflecting a transverse wave (S wave) component of the laser beam being incident on the splitter via the optical path A from the outside toward a phase difference comparator 204, and a phase difference comparator 204 including a photodetector (PD) 206 for detecting the laser beam comprising the transverse wave component output via the polarized beam splitter 205, the comparator 204 outputting a signal corresponding to the phase difference between the signal detected by the photodetector 206 and the signal output from the high frequency generator 203.

The photodetector 206 detects the presence or absence of a laser beam of a predetermined level and above, and outputs a signal corresponding to the level of the laser beam. The laser beam output from the laser beam generator 201 is used for measuring a distance of a first measurement scale which is a short distance (for example, a distance up to 1 meter).

The optical signal processing unit 105 has a similar structure as the optical signal processing unit 104, except for the point that it outputs a laser beam having a third wavelength λ3 (for example, 650 nm) that differs from the wavelengths λ1 and λ2 of the laserbeams utilized by the optical signal processing units 103 and 104. The laser beam utilized by the optical signal processing unit 105 is used for measuring a distance of a measurement scale that is different from the first measurement scale, such as a second measurement scale that is longer than the first measurement scale (for example, a distance up to 100 m).

The optical filter 106 is a filter that reflects the laser beam of a second wavelength λ2 toward the optical signal processing unit 104 and for transmitting the beams having other wavelengths, and can be, for example, a frequency-dependent half mirror formed of a dichroic mirror. The optical filter 106 is disposed at an angle of 45 degrees to the optical path A, and the laser beam of a second wavelength λ2 output from the optical signal processing unit 104 is reflected on the optical filter 106, and thereafter, travels on the optical path A similarly as the laser beam of a first wavelength λ1.

The optical filter 107 is a filter for reflecting the laser beam of a third wavelength λ3 toward the optical signal processing unit 105 and for transmitting the beam of other wavelengths, and similar to the optical filter 106, it is a frequency-dependent half mirror formed of a dichroic mirror. The optical filter 107 is disposed at an angle of 45 degrees to the optical path A, and the laser beam of a third wavelength λ3 output from the optical signal processing unit 105 is reflected on the optical filter 107, and thereafter, travels on the optical path A similarly as the laser beam of wavelengths λ1 and λ2.

Plural motors 110, 111 are connected via an electric cable 114 to the control unit 102. The motor 110 is a motor controlled by the control unit 102, and it rotates in response to a control signal output from the control unit 102 and drives the movable case 113 to rotate in direction X via the rotary drive mechanism 1101. The motor 111 is a motor controlled by the control unit 102, and it rotates in response to a control signal output from the control unit 102 and drives the reflecting mirror 112 to rotate in direction Y which is orthogonal to direction X. The amount of rotation of the movable case 113 from a predetermined position and the amount of rotation of the reflecting mirror from a predetermined position are each detected by an encoder mechanism equipped to the rotary drive mechanism 1101 and the rotary drive mechanism 1111, respectively.

The control unit 102 computes a deviation quantity data representing a quantity of displacement (quantity of deviation) of the laser beam being output to the object to be measured via the reflecting mirror 112 based on the position of the laser beam (return beam) detected by the PSD 117, computes a quantity of correction of the reflecting mirror 112 so that the quantity of deviation becomes zero, controls the motors 110 and 111 so that the quantity of deviation equals zero, and rotates the movable case 113 and the reflecting mirror 112.

The communication I/F 108 is an interface for sending the data computed at the control unit 102 (data such as the distance from a predetermined point to the object, the shape of the object and the traveling speed of the object) via an antenna 109 to another electric device (such as a computer for aggregating data) through radio transmission.

The optical filters 106, 107 and the reflecting mirror 112 are disposed on a common optical path A, and the laser beams output from the optical signal processing units 103 through 105 toward the object of measurement and the laser beams returning from the object of measurement to the optical signal processing units 103 through 105 travel via the optical path A.

Although not shown, the laser measurement apparatus 101 can be equipped with an internal battery for driving the apparatus, or if the apparatus is designed to operate via an external AC power supply, it can be equipped with a slip ring or a transformer unit.

The control unit 102 constitutes a control means for controlling the components of the laser measurement apparatus 101 and the rotation of the reflecting mirror 112, a searching control means for controlling the searching operation for an object, a tracking control means for controlling the tracking operation of the object, a distance computing means for computing the distance, a shape computing means for computing the shape, a speed computing means for computing the speed, and an acceleration computing means for computing the acceleration of the object. The optical filters 106, 107 and the reflecting mirror 112 constituting an optical guiding means constitute an optical path means. The rotary drive mechanism 1101, 1111 including motors 110, 111 together with the control unit 102 constitute a control means for controlling the rotation of the reflecting mirror 112. The polarized beam splitters 116, 205, the optical position sensing device 117 and the photodetector 206 constitute an optical detecting means. The optical signal processing units 103 through 105 constitute an optical signal processing means.

The operation of the laser measurement apparatus 101 according to a first embodiment of the present invention will be described in detail with reference to FIGS. 1 and 2.

First, when the laser measurement apparatus 101 is activated by having the power turned on, the laser measurement apparatus 101 operates in a searching mode in which it detects the object to be measured by controlling the direction of the reflecting mirror 112 via rotary drive mechanisms 1101, 1111 including motors 110, 111 (a rotary drive mechanism having two-degree-of-freedom is constituted by rotary drive mechanisms 1101 and 1111).

According to the searching mode, the control unit 102 drives the motors 110 and 111 so that the laser beam reflected via the reflecting mirror 112 is output toward the object of measurement (actually, a corner cube 100 attached to the object of measurement).

In other words, according to the searching mode, the control unit 102 controls the rotation of the motors 110 and 111 until the transverse wave with wavelength λ1 of the return beam reflected on the object (actually, the corner cube 100 attached to the object) is detected at a predetermined position of the PSD 117 (for example, at the center of PSD 117). Thus, the rotary drive mechanisms 1101, 1111 control the direction of the reflecting mirror 112 so that the transverse wave with wavelength λ1 of the return beam is detected at a predetermined position of the PSD 117.

Here, the control unit 102 constitutes a searching control means. There are plural search patterns, including an orthogonal locus pattern, a diagonal locus pattern and a circular locus pattern (spiral or concentric), prepared and stored in advance in a memory (storage means) of the control unit 102 as standard control patterns (search patterns) for controlling the reflecting mirror 112 and performing searching, according to which the reflecting mirror 112 is driven to change directions with time. The control unit 102 performs the search by selecting a search pattern designated via a manipulation unit (not shown).

When the searching mode is ended, the laser measurement apparatus is shifted to a tracking control mode for tracking a moving object to be measured. A tracking control mode is a mode in which the control unit 102 controls the rotation of the motors 110, 111 so that the laser beam with a wavelength λ1 reflected on the object returns to a predetermined position of the PSD 117 (for example, the origin of coordinates), so as to direct the laser beam output from the laser measurement apparatus 101 toward the object to be measured (actually, the corner cube 100 attached to the object) following the movement of the moving object.

In other words, according to the tracking control mode, the control unit 102 controls the rotation of motors 110 and 111 so that the transverse-wave return beam reflected on the polarized beam splitter is returned to a predetermined position (such as the origin of coordinates) of the optical position sensing device 117. At this time, the control unit 102 constitutes a tracking control means. Thus, the laser beam output from the laser beam generating units 115, 201, 204 of the optical signal processing units 103 through 105 is capable of capturing the object to be measured.

The tracking control mode is described hereafter in further detail. When the object is moving, the position of the return beam is displaced from the predetermined position of the PSD 117. The control unit 102 carries out an operation for determining the X-axis component and the Y-axis component of the quantity of displacement (quantity of deviation) of the return beam, and computes the quantity of correction of the X-axis component and the Y-axis component. The quantity of correction is set as a rotation correction quantity of the movable case 113 and a rotation correction quantity of the reflecting mirror 112, which are utilized to carry out a feedback control. In other words, the control unit 102 controls the motors 110, 111 to rotate corresponding to the quantity of correction determined for the X-axis component and the quantity of correction determined for the Y-axis component, according to which the laser beam λ1 is capable of tracking the object to be measured at all times.

According to the tracking control mode, the return beam of wavelength λ2 from the object returns to the optical signal processing unit 104 and is detected by the photodetector 206. The phase difference comparator 204 detects the phase difference between the detection output signal from the photodetector 206 and the output signal from the high frequency generator 203, and a signal representing the detected phase difference (phase difference signal) is output to the control unit 102. Based on the phase difference signal, the control unit 102 computes the distance r to the object from a predetermined position (such as a center of the reflecting mirror 112) set as a reference. Thus, a measurement is performed to measure a short distance according to the first scale.

When the control unit 102 functions as a position computing means for computing the position of the object based on the output signal from the optical signal processing unit 104 and setting a predetermined position as reference, the control unit 102 determines a quantity of rotation θ of the reflecting mirror 112 driven by the rotary drive mechanism 1101 from a predetermined position and a quantity of rotation φ of the movable case 113 driven by the rotary drive mechanism 1111 from a predetermined position based on signals from encoder units of the rotary drive mechanisms 1101 and 1111. Then, based on the signals from the photodetector 206 and setting the above-described predetermined position as reference, the control unit 102 computes the positional information (r, θ, φ) of the object in a spherical coordinate system.

Data such as the positional information computed at the control unit 102 is sent from the control unit 102 via the communication I/F 108 and the antenna 109 to another electronic device (such as a computer for aggregating data) through radio transmission.

The control unit 102 can be designed to perform other computation such as the measurement of a center distance of a plurality of points. Moreover, the control unit 102 can be designed to compute time using an internal clock of the control unit 102 as a reference in order to compute the speed and the acceleration of the object in three-dimensional space based on the distance information and the position information of the object.

When a distance measurement is performed based on a second scale which is a longer scale, the optical signal processing unit 105 utilizes the laser beam having a wavelength of λ3 to carry out a similar process as described above. Thus, a distance measurement based on the second measurement scale which is longer than the above-described first measurement scale is carried out.

Next, we will describe the details of a scanning mode, which is a mode for carrying out a static measurement such as the measurement of the shape of the object or the distance between predetermined points.

According to the aforementioned searching mode, searching is carried out based on a predetermined search pattern using a laser beam with a wavelength of λ1 until a return laser beam is captured at a predetermined detecting region of the PSD 117, and accordingly, the PSD 117 detects the return laser beam.

On the other hand, the scanning mode is a mode for measuring the shape of a static object or a slowly moving object and the like in a state where the object has been captured via the searching mode. In other words, according to the scanning mode, the control unit 102 outputs demands to the motors 110, 111 for performing a scan using an appropriate pattern with the laser beam for the area including the static or slowly moving object.

In this mode, the return beam with a wavelength of λ2 from the object is returned to the optical signal processing unit 105, detected by the photodetector 206, and subjected to phase difference detection at the phase difference comparator 204, based on which a predetermined data processing is performed at the control unit 102. When the control unit 102 functions as a shape computing means for computing the shape of the object based on the output signal from the optical signal processing unit 104, the control unit computes the shape, such as the curved surface, of the object.

Data such as the shape of the object computed at the control unit 102 is sent from the control unit 102 via the communication I/F 108 and the antenna 109 to another electronic device (such as a computer for aggregating data) through radio transmission.

In the case of performing a measurement based on a second scale in which an object having a large size is to be measured, the optical signal processing unit 105 utilizes a laser beam with a wavelength of λ3 to carry out a similar process as described above. Thus, shape measurement based on the second measurement scale which is longer than the first measurement scale is carried out using the optical signal processing unit 105, and the measurement of a shape or the like of an object having a large size is performed.

Further according to the above-described first embodiment of the present invention, components other than the reflecting mirror 112 and the rotary drive mechanism 1111 including the motor 111, such as the control unit 102, the optical signal processing units 103 through 105 and communication I/F 108, were stored in the movable case 113. However, it is also possible to store only the reflecting mirror 112 and the rotary drive mechanism 1111 including the motor 111 in the movable case 113, and to store the other components in the main case 118.

Next, we will describe a laser measurement apparatus according to a second embodiment of the present invention.

Figure 3:
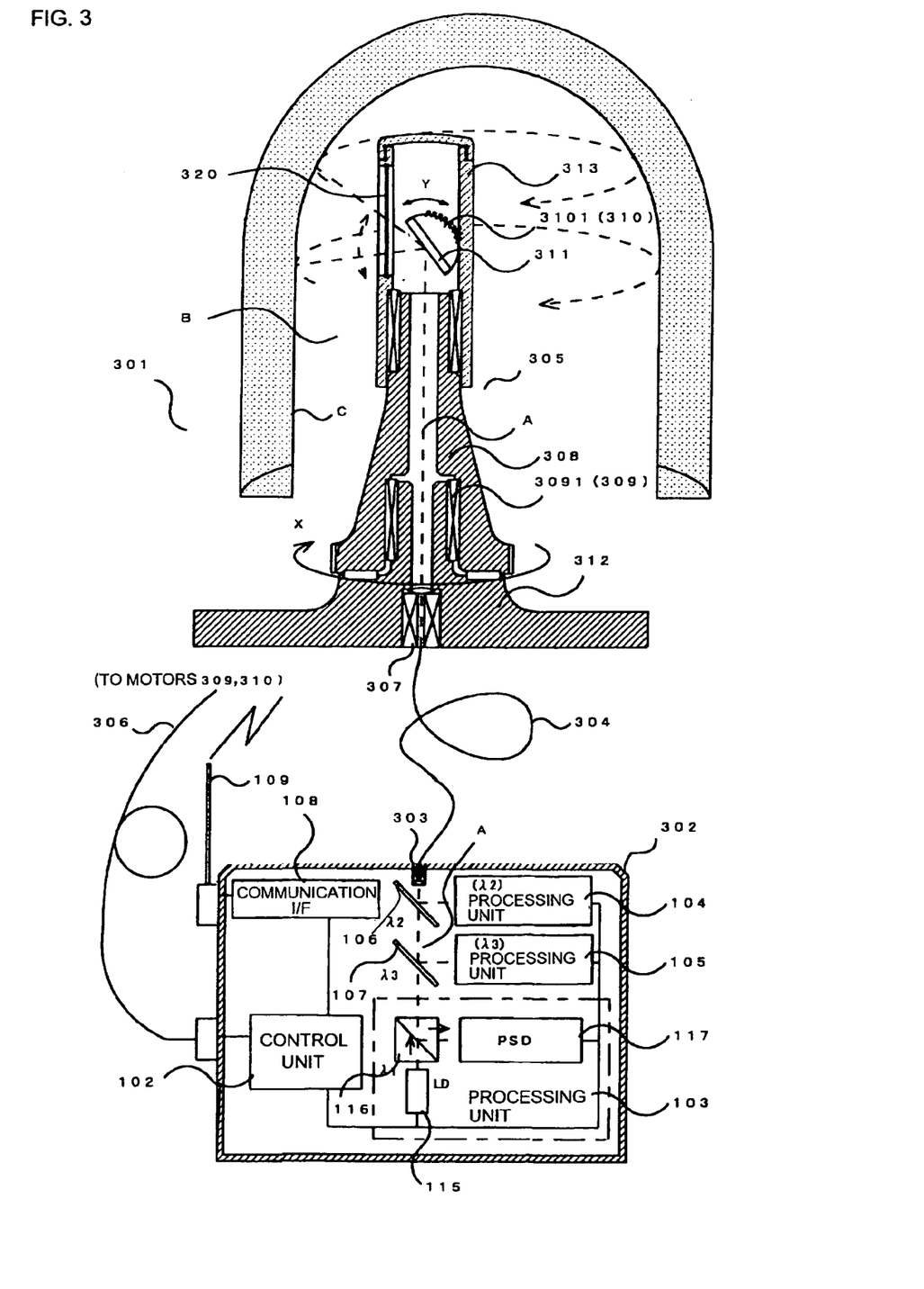
FIG. 3 is a schematic view of a laser measurement apparatus according to a second embodiment of the present invention.
Figure 4:
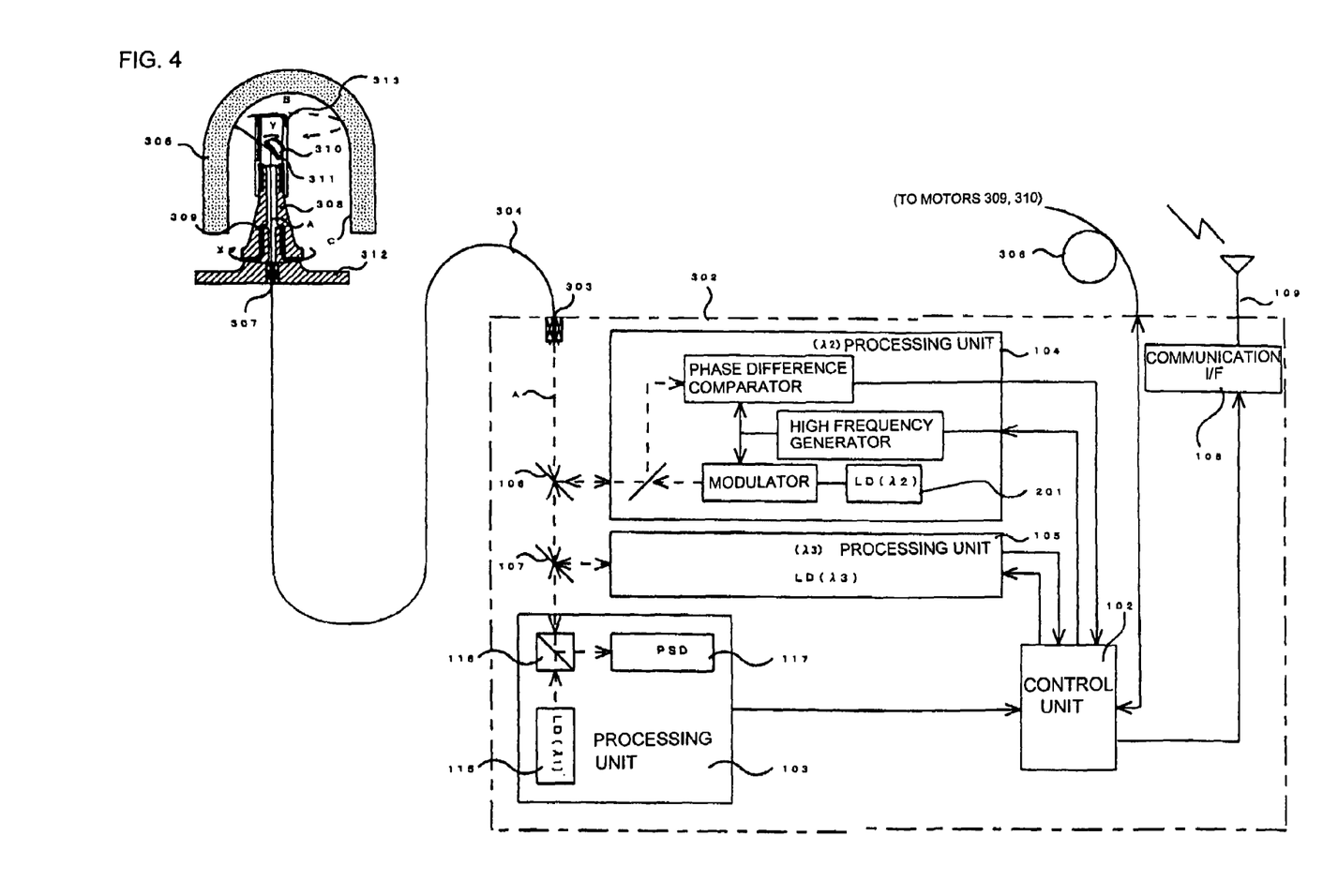
FIG. 4 is a block diagram showing the circuit and the optical system of the laser measurement apparatus according to the second embodiment of the present invention.

FIG. 3 is a schematic view of a laser measurement apparatus according to the second embodiment of the present invention, and FIG. 4 is a view showing the details of the circuit block diagram and the optical system of the laser measurement apparatus according to the second embodiment of the present invention. In FIGS. 3 and 4, the components equivalent to those shown in FIGS. 1 and 2 are denoted with the same reference numbers, and the detailed descriptions thereof are omitted. In the present description, mainly the portions that differ from the first embodiment are explained.

In FIGS. 3 and 4, a laser measurement apparatus 301 according to the second embodiment of the present invention comprises a fixed unit that is fixed to a predetermined position for use, and a mobile unit to be located at a position suitable for measurement such as inside a narrow necked portion or the like for use, wherein the fixed unit is equipped with a main case 302 and the mobile unit is equipped with a minor case 305.

The main case 302 houses a plurality of optical signal processing units 103, 104, 105, plural optical filters 106, 107 and a communication interface (I/F) 108, and an antenna 109 disposed so as to protrude from the main case 302. The optical filters 106, 107 and the like are disposed along the optical path A, similar to those of the first embodiment. Furthermore, a connector 303 for optical communication is equipped to the main case 302.

On the other hand, the minor case 305 is equipped with a base unit 312 to be fixed to a predetermined position, and a movable case 313 supported so as to be able to rotate in direction X (that is, in a plane orthogonal to the sheet surface) on the base unit 312.

The minor case 305 contains a connector 307 for optical communication, an optical guiding cylinder 308 which is a cylindrical member for guiding light, a rotary drive unit (rotary drive mechanism) 3091 with a rotary encoder having a motor 309, a rotary drive unit (rotary drive mechanism) 3101 with a rotary encoder having a motor 310, and a reflecting mirror 311. The motors 309 and 310 are connected via an electric cable 306 to the control unit 102, and the rotations of the motors are controlled by the control unit 102. It is also possible to control the rotations of the motors 309 and 310 through wireless communication without using an electric cable.

The rotary drive mechanism 3091 drives the movable case 313 to rotate in direction X, and the rotary drive mechanism 3101 drives the reflecting mirror 311 to rotate in direction Y (that is, in a plane parallel to the sheet surface). Moreover, the connector 303 for optical communication and the connector 307 for optical communication are connected via an optical fiber cable 304. This structure enables the apparatus to measure a relative displacement or a defect of a specific region such as a narrow necked portion B.

The rotary drive mechanism 3091 comprises a rotary drive function for driving the movable case 313 to rotate and an encoder function for detecting the amount of rotation of the movable case 313. The rotary drive mechanism 3101 has a rotary drive function for driving the reflecting mirror 311 to rotate and an encoder function for detecting the amount of rotation of the reflecting mirror 311.

The movable case 313 is equipped with a window portion 320 formed of a light transmitting material.

The minor case 305 of the mobile unit is designed to have a small pencil-like shape so as to enable the inspection of a narrow necked portion B. Inside the movable case 313 is disposed a small reflecting mirror 311 that is angled at 45 degrees with respect to the axis of rotation (in the case of a single-degree-of-freedom). The base 312 is fixed to a position that serves as a reference. In the case of a two-degree-of-freedom, the angle of the mirror is made variable by sliding a wheel and axle in addition to the rotation.

The optical fiber cable 304 and the optical guiding cylinder 308 together with the optical filters 106, 107 and the like constitute an optical path means. Further, the rotary drive mechanism 3091 including the motor 309 and the rotary drive mechanism 3101 including the motor 310 together with the control unit 102 constitute a control means.

The laser measurement apparatus 301 formed as described above operate basically similarly as the first embodiment, measuring the distance from a predetermined position (such as the center of the reflecting mirror 311) to a side wall C of the narrow necked portion B, the shape of the side wall C of the narrow necked portion B, and so on.

However, since the optical path for the laser beam includes an optical fiber cable 304 according to the second embodiment of the present invention, the laser beam being transmitted between the optical signal processing units 103 through 105 and the object such as the narrow necked portion B travels via the optical fiber cable 304. Further, under the control of the control unit 102, the reflecting mirror 311 is driven to rotate in direction Y by the rotary drive mechanism 3101 with the motor 310, and the movable case 313 is driven to rotate in direction X by the rotary drive mechanism 3091 with the motor 309.

According thereto, the reflecting mirror 311 is driven to rotate both in direction X and direction Y, and the laser beam traveling via the optical fiber cable 304 and reflected on the reflecting mirror 311 is irradiated to the narrow necked portion B through the window portion 320. The laser beam reflected on the narrow necked portion B passes through the window portion 320 and is reflected again on the reflecting mirror 311, and travels via the optical fiber cable 304 toward the optical signal processing units 103 through 105.

The control unit 102 computes the distance to the object or the shape thereof based on the signals from the optical signal processing units 103 through 105, and the computed data is sent in a manner similar to the first embodiment from the control unit 102 via the communication I/F 108 and the antenna 109 to another electronic device (such as a computer for aggregating data) through radio transmission.

In measuring the distance to an object to be measured, according to the first embodiment, a positional information (absolute information) using as reference a predetermined point in the laser measurement apparatus 101 (such as a center of the reflecting mirror 112) is computed, whereas according to the second embodiment, a positional information (relative information) using as reference a predetermined point that can be associated with the mobile unit is computed.

The laser measurement apparatus according to the second embodiment of the present invention not only has the same effects as the first embodiment of the invention, but also enables to measure an object which is narrow (like the narrow necked portion B) or hidden, since it has an optical fiber cable 304 included in its optical path.

As described, according to the preferred embodiments of the present invention, the laser measurement apparatus characterizes in comprising: a plurality of laser beam generating units 115, 201 for outputting laser beams having different characteristics such as different wavelengths; a plurality of photodetector means 116, 117, 205, 206 corresponding to each of the laser beams for detecting the corresponding laser beams, respectively; and an optical path means (reflecting mirrors 112, 311, optical filters 106, 107, and optical fiber cable 304) for guiding the laser beams output from the plurality of laser beam generating units 115, 201 via a common optical path A to the object and to guide the laser beams returning from the object via the common optical path A to the photodetecting means 116, 117, 205, 206.

Furthermore, the optical path means includes a reflecting mirror 112, 311 serving as one type of optical guiding means, and the apparatus further comprises a control unit 102 and rotary drive mechanisms 1101, 1111, 3091, 3101 for controlling the reflecting mirror 112, 311 so as to guide the laser beams output from the plurality of laser beam generating unit 115, 201 to the object and to guide the laser beams returning from the object to the plurality of photodetecting means.

One of the plurality of laser beams having different characteristics is a laser beam used for tracking, and the photodetecting means corresponding to that laser beam comprises an optical position sensing device 117, wherein based on the output signal from the optical position sensing device 117, the control unit 102 controls the direction of the reflecting mirror 112, 311 so that the laser beam output from the plurality of laser beam generating units 115, 201 are reflected toward the object.

The above-mentioned plurality of laser beams having different characteristics include a plurality of laser beams for measuring distances to be measured according to different measurement scales, and the optical signal processing means 104, 105 corresponding to each of the laser beams comprises a photodetector 206 for detecting the presence or absence of a beam of a predetermined level and above and to output a signal corresponding to the presence or absence of a beam, and the above-mentioned control means computes the distance between the object and a reference position based on the output signals from the photodetectors 206.

As described, according to the present invention, the laser measurement apparatus performing measurement using laser beams is capable of carrying out various types of measurement by a simple structure, since various types of laser beams with different properties are guided via a common optical path toward the object. Furthermore, according to the present invention, the laser measurement apparatus can be downsized.

According further to the present invention, for example, the apparatus is capable of searching an object moving in three-dimensional space, and after the search, it is capable of tracking the moving object. It is also capable of computing positional information, speed information or the like while tracking the object.

Furthermore, by scanning a static object (including an object that is moving at a slow speed), the apparatus can measure the three-dimensional shape of the object. By extracting the characteristic features of the shape of the object and by subjecting the data to appropriate data processing, it is possible to measure, for example, the center position of imperceptible holes or the center distance thereof.

By adopting an optical fiber cable in the apparatus, it becomes possible to carry out measurement in even a narrow necked portion, and thus it becomes possible to measure the inner surface are or to inspect the inside of a pipe. Further, by adopting the optical fiber cable, the apparatus can be utilized effectively to carry out measurement under such environments where the rectilinearity of light is impeditive or where there is danger.

An optical position sensing device (PSD) was used as position detecting device according to the preferred embodiments described above. However, other devices can be used as long as it can detect the position of the received laser beam. For example, it is possible to use a charge-coupled device (CCD) and the like, but a lighting device is required when utilizing a CCD to search, scan and track an object, so from this viewpoint it is better to use a PSD.

In a shipyard, the welding process is performed based on the signals/instructions from an experienced professional and using a surveying instrument, but by adopting the laser measurement apparatus according to the present embodiment, the welding operation can be performed with a much smaller group of workers and a higher level of safety, and it becomes possible for the crane operators to share the dimension measurement data of components, according to which a prompt operation becomes possible.

Since ultrasonic waves are affected greatly by the temperature and humidity of the environment, it is difficult to utilize the ultrasonic waves to measure a wide area with accuracy, and since charge-coupled devices are affected greatly by the surrounding lighting, it is not suitable for accurately detecting indefinite wall surfaces and the like. However, by adopting the apparatus according to the present embodiments, for example, to a carry in/carry out operation in an underground storage, the apparatus can measure the location of the wall surfaces for preventing interference, and it becomes possible to perform measurement with a much higher accuracy than when ultrasonic waves or CCDs are used.

At present, the operating radius of a crane that determines the performance of the crane is computed based on a roughly measured value obtained by measuring the length of a boom subjected to "deflection and backlash" using a cord reel and an encoder and the swelling angle of the deflected boom, or in other words, based on uncertain data. Moreover, such determination is based on an assumption that there is no swinging of the hanging load and that the crane is located on a horizontal solid ground, which is an impossible assumption. Therefore, it is difficult to compute the accurate operating radius. By utilizing the laser measurement apparatus according to the above-described embodiment, it becomes possible to follow the movement of the hanging load and to directly measure the position of the load, so the true operating radius of a crane, which is a most important factor of the crane performance, can be computed even if the boom is subjected to deflection or backlash, the load is swinging, or the crane is slanted.

Moreover, in the construction of a dam that requires a long-term casting of concrete, load swing control of a crane is necessary to realize the automatic operation of the crane and to reduce the load of the crane operator. In such case, it is necessary to measure the position of the hanging load in real time, which is enabled by use of the laser measurement apparatus according to the embodiments of the present invention.

Moreover, by using the present laser measurement apparatus, it becomes possible to observe across the ages the ground of an earthquake danger area, the strain of an architectural structure and so on, according to which prediction and measurement evaluation become possible.

The laser measurement apparatus according to the present embodiment can be applied to various fields of art. For example, it can be applied to the measurement of the position, the speed and the size of a moving or static object either outdoor, indoor or in a plant or at a construction site that requires shape measurement, to a work position determination in a machinery manufacture line and in a turntable-type manufacture line, to a tracking-type position measurement of a fluctuating gauge point on the sea, to a frame measurement tool in a shipyard, to a navigation system for underground areas and in tunnels (utilizing the positioning function), to a disaster prediction and observation system for landslide and avalanche, to an operating radius measurement apparatus for a construction machine, to a position coordinate detection for controlling the hanging load of an automated crane, and to an earthquake prediction system at a nuclear plant or the like.

Other possible application examples include a measurement means for measuring the welding frame in a shipyard, a three-dimensional measurement apparatus for a manufacture line of an automobile or an aircraft (especially for positioning and shape measurement), a three-dimensional measurement apparatus for measuring towers, piping and the like in a plant, danger prediction and safety system for a nuclear plant, a navigation system in an underground storage, a measurement means for a safety system equipped to a construction machine such as a crane (including the means for securing a distance between the construction machine and buildings), a three-dimensional position sensing device for controlling an automatically operated crane, an inspection and measurement apparatus for inspecting a narrow necked portion, an optical transmission device connected to a buoy at sea, and a measurement apparatus or an abnormality detecting apparatus in a deep underground space.

The present laser measurement apparatus can also be applied to other uses such as a navigation system of a boring machine, an interval meter for measuring the distance between vehicles, a dimension measurement apparatus for a tunnel (the measurement of the dimension of the tunnel wall, the measurement of distance between vehicle and tunnel, or the measurement of distance between vehicles), a local positioning system for use in areas where global positioning system (GPS) is not available (local specification), a measurement apparatus for measuring the distortion of a railway car body or the like, a measurement apparatus for measuring the frame distortion of an accident car or the like, or as a security system (confirmation of locks, output of warning against intruders, etc.).

According to the above-mentioned embodiment, the laser beams having different characteristics utilized by the optical signal processing units 103 through 105 had different wavelengths, but it is also possible to utilize laser beams having different phases and so on. Moreover, the signals detected by each of the optical signal processing units 103 through 105 can be used to perform various measurements according to the determined functions of the control unit 102. Even further, according to the present invention, a reflecting mirror is used as the optical guiding means for guiding the laser beams to the object, but it is also possible to use as the optical guiding means an electrically controllable photorefractive material. Moreover, various modifications can be made to the present embodiment, such as utilizing the optical signal processing unit 104 as the optical signal processing unit used for measuring a long distance having a large margin of error and utilizing the optical signal processing unit 105 as the optical signal processing unit for measuring a short distance with high accuracy.

The present invention enables to provide a laser measurement apparatus for carrying out measurement using laser beams that is capable of performing various types of measurement with a simple structure. Further according to the present invention, it is possible to downsize the laser measurement apparatus effectively.

What is claimed is:

1. A laser measurement apparatus comprising:
    a plurality of laser beam generating means for outputting laser beams having different characteristics;
    a plurality of optical signal processing means disposed so as to correspond to each of the laser beams for detecting the corresponding laser beam and carrying out a predetermined process; and
    an optical path means for guiding the laser beams output from the plurality of laser beam generating means via a common optical path to an object and for guiding the laser beams returning from the object via the common optical path to the optical signal processing means,
    wherein the optical path means comprises a plurality of optical filters, each of the plurality of optical filters serving to combine a respective one of the laser beams output to the object from the plurality of laser beam generating means with the common optical path, and to separate the respective one of the laser beams returning from the object from the common optical path.

2. The laser measurement apparatus according to claim 1, wherein
    the optical path means includes an optical guiding means; and
    the laser measurement apparatus further comprises a control means for controlling the optical guiding means so as to guide the laser beams output from the plurality of laser beam generating means toward the object and to guide the laser beams returning from the object toward the plurality of optical signal processing means.

3. The laser measurement apparatus according to claim 2, wherein
    the optical guiding means is a reflecting mirror; and
    the control means controls the reflecting mirror to reflect the laser beams output from the plurality of laser beam generating means toward the object and to reflect the laser beams returning from the object back toward the plurality of optical signal processing means.

4. A laser measurement apparatus comprising:
    a plurality of laser beam generating means for outputting laser beams having different characteristics;
    a plurality of optical signal processing means disposed so as to correspond to each of the laser beams for detecting the corresponding laser beam and carrying out a predetermined process; and
    an optical path means for guiding the laser beams output from the plurality of laser beam generating means via a common optical path to an object and for guiding the laser beams returning from the object via the common optical path to the optical signal processing means,
    wherein
    the optical path means includes an optical guiding means;
    the laser measurement apparatus further comprises a control means for controlling the optical guiding means so as to guide the laser beams output from the plurality of laser beam generating means toward the object and to guide the laser beams returning from the object toward the plurality of optical signal processing means;
    the optical guiding means is a reflecting mirror;
    the control means controls the reflecting mirror to reflect the laser beams output from the plurality of laser beam generating means toward the object and to reflect the laser beams returning from the object back toward the plurality of optical signal processing means;

one of the plurality of laser beams having different characteristics is a laser beam used for tracking, and the optical signal processing means corresponding to this laser beam comprises an optical position sensing device; and the control means controls the direction of the reflecting mirror so that the laser beams output from the plurality of laser beam generating means are reflected toward the object based on signals output from the optical position sensing device.

5. A laser measurement apparatus comprising:

a plurality of laser beam generating means for outputting laser beams having different characteristics;

a plurality of optical signal processing means disposed so as to correspond to each of the laser beams for detecting the corresponding laser beam and carrying out a predetermined process; and an optical path means for guiding the laser beams output from the plurality of laser beam generating means via a common optical path to an object and for guiding the laser beams returning from the object via the common optical path to the optical signal processing means, wherein the plurality of laser beams having different characteristics include plural laser beams for measuring distances according to different measurement scales, and the optical signal processing means corresponding to each of the laser beams have photodetectors that detect the presence or absence of a beam that of a predetermined level and above, and outputs a signal corresponding to the presence or absence of such beam; and the control means computes a distance between the object and a reference position based on the output signals from each of the photodetectors.

6. The laser measurement apparatus according to claim 2, wherein the plurality of laser beams having different characteristics include plural laser beams for measuring distances according to different measurement scales, and the optical signal processing means corresponding to each of the laser beams have photodetectors that detect the presence or absence of a beam that of a predetermined level and above, and outputs a signal corresponding to the presence or absence of such beam; and the control means computes a distance between the object and a reference position based on the output signals from each of the photodetectors.

7. The laser measurement apparatus according to claim 3, wherein the plurality of laser beams having different characteristics include plural laser beams for measuring distances according to different measurement scales, and the optical signal processing means corresponding to each of the laser beams have photodetectors that detect the presence or absence of a beam that of a predetermined level and above, and outputs a signal corresponding to the presence or absence of such beam; and the control means computes a distance between the object and a reference position based on the output signals from each of the photodetectors.

8. The laser measurement apparatus according to claim 4, wherein the plurality of laser beams having different characteristics include plural laser beams for measuring distances according to different measurement scales, and the optical signal processing means corresponding to each of the laser beams have photodetectors that detect the presence or absence of a beam that of a predetermined level and above, and outputs a signal corresponding to the presence or absence of such beam; and the control means computes a distance between the object and a reference position based on the output signals from each of the photodetectors.

9. The laser measurement apparatus according to claim 1, wherein the optical path means includes an optical fiber cable.

10. The laser measurement apparatus according to claim 2, wherein the optical path means includes an optical fiber cable.

11. The laser measurement apparatus according to claim 3, wherein the optical path means includes an optical fiber cable.

12. The laser measurement apparatus according to claim 4, wherein the optical path means includes an optical fiber cable.

13. The laser measurement apparatus according to claim 5, wherein the optical path means includes an optical fiber cable.

* * * * *